May 5, 1970 K. C. WORD 3,509,920
APPARATUS FOR PRODUCING A DECORATIVE FOOD PACKAGE
Filed Oct. 4, 1965 2 Sheets-Sheet 1
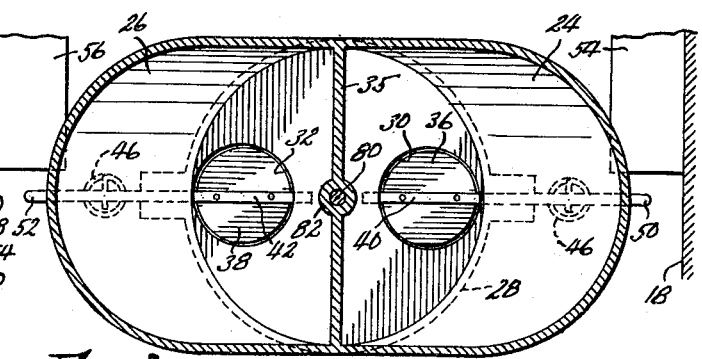
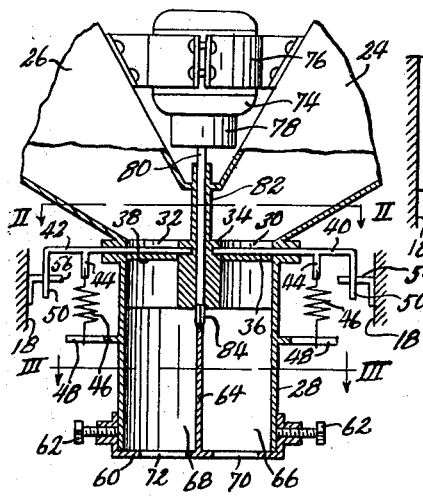
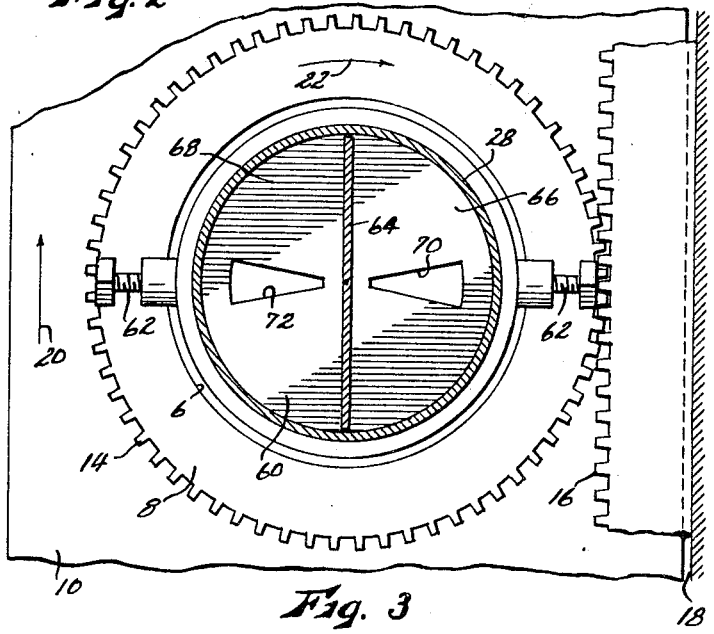
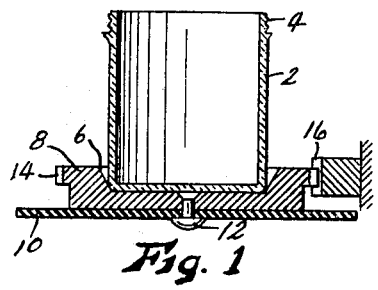
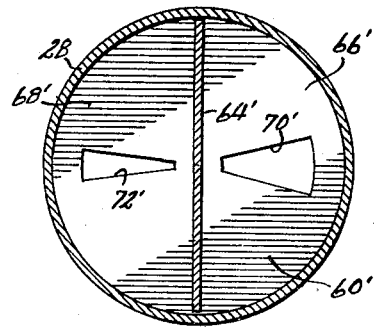
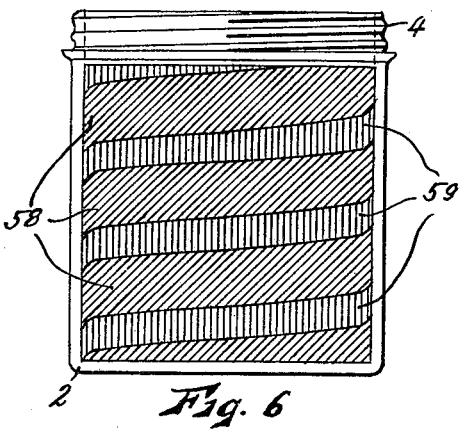
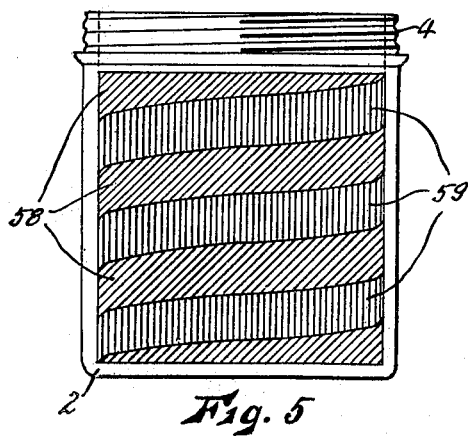
INVENTOR.
Kenneth C. Word
BY John A. Hamilton
Attorney.

May 5, 1970  K. C. WORD  3,509,920
APPARATUS FOR PRODUCING A DECORATIVE FOOD PACKAGE
Filed Oct. 4, 1965  2 Sheets-Sheet 2
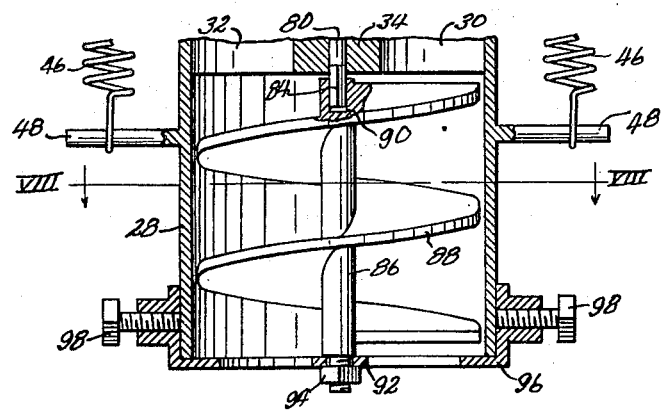
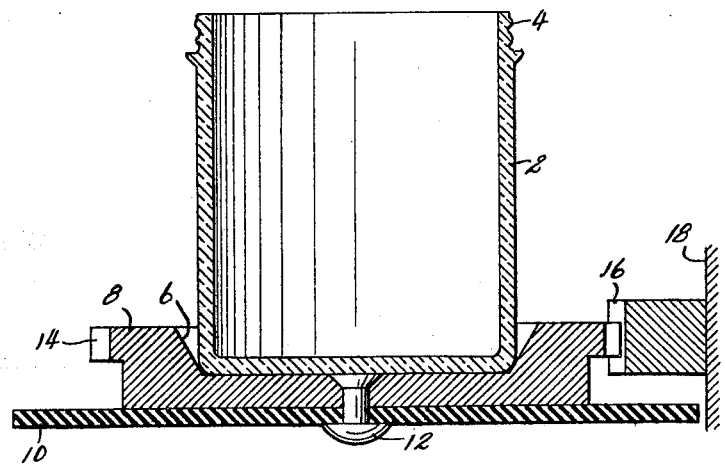
Fig. 7
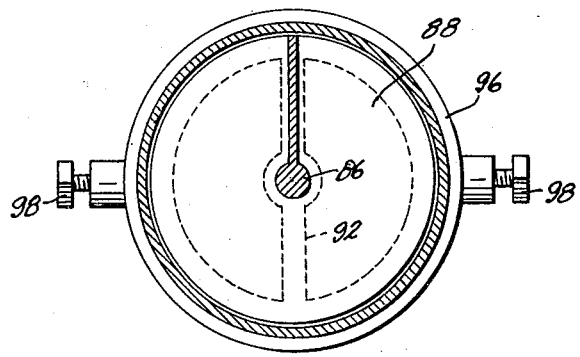
Fig. 8
INVENTOR.
Kenneth C. Word
BY John A. Hamilton
Attorney.

United States Patent Office 3,509,920
Patented May 5, 1970

3,509,920
APPARATUS FOR PRODUCING A DECORATIVE
FOOD PACKAGE
Kenneth C. Word, 1701 Hillcrest Drive,
Carthage, Mo. 64836
Filed Oct. 4, 1965, Ser. No. 492,770
Int. Cl. B65b 3/06
U.S. Cl. 141—100                    3 Claims

ABSTRACT OF THE DISCLOSURE

Flowable food materials of contrasting colors such as peanut butter and jelly are contained within separate hoppers. The materials flow from the hoppers through metering valves, into a partitioned filling head, through an aperture plate, and into a rotating container.

---

This invention relates to new and useful improvements in food packaging, and has as its principal object the provision of a food package consisting of a transparent container such as a glass jar or flexible plastic tube containing two or more food products of contrasting colors arranged therein in a decorative pattern which is visible through the transparent walls of the container. By way of example only, peanut butter and jelly have been selected as the food materials which will be discussed in the following disclosure of the principles of the invention. These food materials are often intermixed in actual usage, as in the making of peanut butter and pelly sandwiches. Therefore, the intermingling thereof in a single container for sale constitutes a convenience to the user, and the decorative pattern of the materials in the container greatly increases the sales appeal thereof. The patterns selected for illustration consist either of alternate helical layers of the materials whereby to create a "barber-pole" pattern, or the slight intermingling of the materials in a random pattern wherein the masses of each materials are large enough to be distinguishable, whereby to produce a "marbleized" pattern, although other patterns will readily suggest themselves.

Other objects are the provision of a method and apparatus for producing a decorative food package of the character described in a rapid, convenient and economical manner.

With these objects in view, as well as other objects which will appear in the course of the specification, reference will be had to the accompanying drawing, wherein;

FIG. 1 is a vertical sectional view, shown partially schematically and with parts broken away, of a container filling apparatus adapted to produce a decorative food package in accordance with the teaching of the present invention, with a container shown in operative relationship thereto, FIG. 2 is an enlarged, fragmentary sectional view taken on line II—II of FIG. 1, FIG. 3 is an enlarged, fragmentary sectional view taken on line III—III of FIG. 1, FIG. 4 is a fragmentary view similar to FIG. 3 but showing a slightly modified construction, FIG. 5 is a side elevational view of a container filled by the apparatus illustrated in FIGS. 1–3, FIG. 6 is a side elevational view of a container filled by the modification of the apparatus shown in FIG. 4, FIG. 7 is an enlarged, fragmentary view similar to FIG. 1 but showing a modification of the apparatus adapted to produce another decorative pattern of materials in the container, FIG. 8 is an enlarged, fragmentary sectional view taken on line VIII—VIII of FIG. 7.

The method contemplated by the present invention involves the use of food materials which at normal room temperatures are jellified or semi-solid, but which when heated to a sufficient degree may be converted to a sufficiently liquid state to be flowable by gravity through an aperture, and which when deposited simultaneously in a container while in said liquid or flowable condition will not intermix with each other, but will remain in clearly distinguishable masses. Peanut butter and jelly conform to these requirements, although the temperature required to produce the desired degree of liquidity may vary depending on the ingredients of the products. Further, the method includes the flowing of the respective materials through separate apertures above the container to be filled through a flow controlling device disposed intermediate the apertures and the container, and the production of a relative motion between the flow controlling device and the container whereby to produce a decorative pattern of said materials within said container. In one form, the flow controlling device produces a ribbon of each material, the transverse widths of the ribbons being disposed radially of the container and being offset angularly from each other with respect to the vertical axis of the container, and the container is rotated about its vertical axis as said ribbons are deposited therein by gravity, whereby to produce a helical pattern of alternate radially coextensive layers of the two materials. In another form, the flow controlling device slightly intermingles or "folds" the two materials together as they emerge from the apertures and before they are deposited in the container, it being immaterial in this form whether the container is rotated. This produces a random intermixture providing a "marbleized" pattern.

An apparatus capable of producing either of the above described patterns selectively is illustrated in the drawing, to which reference is now made. It will be seen therein that the container to be filled is shown as an ordinary transparent glass jar 2 of substantially cylindrical configuration, open at one end and threaded externally at 4 to receive the usual threaded closure cap, not shown. During the filling operation, the base of said jar is rested in a socket 6 formed therefor in a circular turntable 8, the jar being disposed with its cylindrical axis vertical, and with its open end up. The fit of the jar in the socket is sufficiently snug to prevent relative rotation therebetween because of the "drag" exerted on the jar by reason of the food materials being deposited therein as will presently appear. Alternatively, the exterior surface of the jar and the socket walls could be correspondingly fluted or otherwise roughened to prevent said relative rotation. Turntable 8 is mounted for rotation on a vertical axis on a belt 10 or other conveyor by means of rivet 12. It will be understood that belt 10 moves horizontally at a uniform speed during the filling operation.

The rim of turntable 8 is toothed to form a gear wheel 14 which is meshed with a straight horizontal gear rack 16 which is stationary and affixed to a machine frame indicated at 18. Thus as belt 10 moves in the direction of arrow 20 in FIG. 3, turntable 8 and hence jar 2 is rotated in the direction of arrow 22. It will be understood that rack 16 is sufficient length that the jar is rotated continuously during the time food materials are being deposited therein.

The two food materials to be deposited in the jar, for example peanut butter and jelly, are carried respectively in a pair of hoppers 24 and 26 above belt 10, said hoppers communicating at their lower ends with a vertical cylindrical filling head 28 which is affixed to said hoppers, communication between said hoppers and said filling head being respectively through passages 30 and 32 formed vertically in a valve block 34 fitted tightly in the upper end of the filling head. Direct communication between the hoppers is prevented by a partition wall 35 therebetween (see FIG. 2). Passages 30 and 32 are controlled respectively by a pair of valve discs 36 and 38 each normally disposed to obstruct and close its associated passage but being pivotal about its diameter as an axis to permit flow of material through said passage. Said valve discs are fixedly mounted respectively on shafts 40 and 42 which are horizontal and rotatably mounted in valve block 34 and which bisect passages 30 and 32 respectively. Said shafts extend outwardly from filling head 28, transversely to the direction of travel of belt 10, and the extended portion thereof is provided with a short crank arm 44 (see FIG. 1) which extends downwardly when the associated valve is closed, and which is connected by a tension spring 46 to a post 48 affixed to filling head 28. Thus said springs bias valves 36 and 38 toward a closed position at all times. It will be understood that hoppers 24 and 26, as well as filling head 28, move horizontally parallel to the travel of belt 10 during the entire filling operation and that filling head 28 is disposed concentrically above jar 2 during this period. While the means for accomplishing this movement are not shown, they are common and well known in the art. For example, the hoppers may be part of a large rotating machine head, with a large number of filling heads 28 attached thereto in a circular ring arrangement, while belt 10 having a large number of turntables 8 mounted thereon moves in a circular horizontal path under at least a portion of the circular path of filling heads 28.

Valve shafts 40 and 42 are provided at their extreme outer ends with crank arms 50 and 52 respectively, said crank arms cooperating respectively with a pair of operating tracks 54 and 56 fixed to machine frame 18 alongside the path of travel of filling head 28, and having the form of elongated horizontal bars. Thus whenever the movement of the filling head brings either of cranks 50 or 52 into engagement with its associated track 54 or 56, said track pivots said crank against the biasing force of spring 46 to open the associated valve 36 or 38 to permit food material to flow from hoppers 24 or 26 into filling head 28. If the food materials require heating to bring them to the requisite state of liquidity, such as peanut butter and jelly, the hoppers 24 and 26 may be equipped with electric or other suitable heaters, not shown, for this purpose. The operating tracks 54 and 56 are so positioned along the horizontal path of travel of the filling head that said filling head is disposed directly above jar 2 before either valve is opened, and the length of said tracks is so adjusted that each "metering" valve 36 and 38 remains open just long enough to admit the precise amount of the food material controlled thereby which may be required in the filling of one jar 2. The amounts of the two materials need not be equal, as will presently appear.

Also utilized are "flow controlling means" interposed between the valve passages 30 and 32 and jar 2 for producing various patterns of the food materials in jar 2. For example, it may be desired to produce alternate helical layers of peanut butter 58 and jelly 59, the layers being either of equal thickness as illustrated in FIG. 5, or of unequal thickness as shown in FIG. 6, the latter sometimes being desirable for reasons of taste or of relative costs of the food materials. The "flow controlling means" means for producing the patterns shown in FIGS. 5 and 6 is illustrated in FIGS. 1, 3, and 4 and consists of an aperture plate 60 covering the lower end of filling head 28, being releasably fixed thereto by set screws 62. Affixed rigidly to said aperture plate is a partition wall 64 which extends vertically upwardly into the filling head to valve block 34, and divides said filling head diametrically into a pair of chambers 66 and 68 into which food materials are fed respectively from metering valves 36 and 38, said partition wall preventing intermixture of the materials within the filling head. The aperture plate has two apertures therein, aperture 70 draining chamber 66, and aperture 72 draining chamber 68. Thus the two food materials flow independently through the two apertures, and are formed thereby into "ribbons" having the cross-sectional contour of said apertures, which are generally narrow and elongated, and of course angularly offset with respect to the common axis of the filling head 28 and jar 2. They are, however, wider at their outer ends than at their inner ends, since the portions of the ribbons formed by the outer ends of the apertures are deposited in the outer portions of the jar and hence must cover more area than the portions of the ribbons formed by the inner end portions of the apertures, which are deposited in the central portion of the jar. The tapering of the apertures 70 and 72 as shown is therefore desirable in providing a smooth, even filling of the jar. The ribbons of food material passing through apertures 70 and 72 fall by gravity into jar 2, and due to the rotation of said jar about its vertical axis by gear 14 and rack 16 as previously described are caused to be laid in alternate radially coextensive helical layers as shown in FIGS. 5 and 6, in which the jelly is lined for the color red, and the peanut butter is lined for the color brown. This pattern of the materials not only provides a greatly increased sales appeal, but also is a matter of convenience to the eventual user in that he will automatically obtain both materials, in approximately the correct ratio, when spooning or otherwise removing the materials from the jar for use. If, as in FIG. 3, the apertures 70 and 72 are of equal angular extent, and if the materials flow through the apertures at equal rates, then the layers 58 and 59 will be of equal thickness as shown in FIG. 5. The relative flow rates of the two materials may be regulated to a large extent by governing the temperatures thereof in hoppers 24 and 26. However, it may be that in some cases for reasons of taste, preference, relative costs of the food materials, etc., it may be desired that more of one food material be used than of the other. This condition may be obtained as shown in FIG. 4, which is similar to FIG. 3 with corresponding parts being designated by corresponding primed numerals, and in which the apertures 70′ and 72′ corresponding to apertures 70 and 72 of FIG. 3 are of unequal angular extent. Thus if narrower aperture 72′ handles jelly and wider aperture 70′ handles peanut butter, the jelly layer 59 in the jar will be thinner than the peanut butter layer 58, as shown in FIG. 6. To some degree, this effect could also be obtained by lowering the temperature of the product of which a thinner layer is desired, whereby to increase the viscosity thereof and decrease the rate at which it will flow by gravity through its associated aperture 70 or 72, even though said apertures might be of equal size.

FIGS. 1, 7 and 8 show modifications of the structure adapted to produce a random intermixture of the materials providing a "marbleized" pattern thereof in the container or jar 2. These modifications include an electric motor 74 mounted between hoppers 24 and 26 by means of bracket 76 (see FIG. 1), and operating through any suitable speed reducer device 78 to drive a vertically downwardly extending shaft 80 at a low speed. Said shaft is journalled in a bearing sleeve 82 forming a portion of partition wall 35, and in valve block 34, and extends at its lower end into the upper end portion of filling head 28, that portion thereof extending below valve block 34 being squared as indicated at 84. Refering next to FIGS. 7 and 8, an auger having a vertical shaft 86 and a helical flight 88 is disposed axially in filling head 28, the upper end of auger 86 having a squared socket 90 formed therein for receiving the squared end 84 of shaft 80 non-rotatably therein so that said auger is rotated by said shaft. The lower end of auger shaft 86 is journalled rotatably in a bar 92 extending diametrically across the lower end of the filling head but not appreciably obstructing it, and secured in said bar by a nut 94 threaded thereon. Said bar forms an integral part of a retainer ring 96 releasably secured about the lower end of the filling head by set screws 98. Retainer ring 96 and auger 86–88 are of course inserted in and affixed to the filling head only after aperture plate 60 and partition wall 64 have been removed, and are interchangeable therewith. Thus, as the food materials enter the filling head through metering valve passages 30 and 32, as previously described, they are engaged and slightly intermixed by the auger. They are not thoroughly intermixed due to the slow auger speed and the fact that the auger has only a very few turns, but produce a random intermixture having definite and recognizable masses of each of the two food materials. This random intermixture of food materials then falls by gravity into jar 2, to provide a "marbleized" pattern visible through the transparent walls of said jar. It is actually immaterial in this operation whether jar 2 itself is rotated or not, and the gear 14-rack 16 connection could be deactivated if desired, although this is not necessary. However, if jar 2 does rotate, it should turn in the opposite direction from, or at a different speed than auger 86–88, in order to insure uniform, even filling of the jar. On the other hand, when conducting the type of operation illustrated in FIG. 1, motor 74 is of course inoperative to perform any useful function, and can therefore be deactivated.

While I have shown and described certain specific decorative effects which can be obtained by application of the principles of my invention, and have shown and described certain methods and apparatus for carrying out my invention, it will be readily apparent that many minor changes and modifications of all of these concepts could be made without departing from the spirit of the invention as defined by the scope of the appended claims. Particularly with regard to the helical filling as illustrated in FIGS. 1–6, it will be apparent that various decorative patterns other than those shown could be obtained by altering the size and configuration of apertures 70 and 72, or by varying the pattern of rotation of turntable 8, as by making the rotation thereof intermittent, or reversing said rotation for a short time at intervals during the filling operation.

What I claim as new and desire to protect by Letters Patent is:

1. An apparatus for producing a decorative food package consisting of a transparent container having a plurality of food materials of contrasting colors arranged therein in a decorative pattern visible through said container, said apparatus comprising:
   (a) a plurality of hoppers each containing one of said food materials in a condition sufficiently liquid to be flowable by gravity but having sufficient viscosity to prevent intermixture thereof when deposited substantially simultaneously in said container,
   (b) a hollow filling head communicating with said hoppers,
   (c) flow controlling means carried by said filling head to direct the flow of said food materials within said head comprising a partition wall dividing said filling head internally into a plurality of chambers each in association with a hopper and each adapted to receive one of said food materials from its associated hopper,
   (d) an aperture plate covering the lower end of said filling head and having a plurality of apertures formed therein each adapted to drain one of said chambers, said apertures being angularly offset with respect to the vertical axis of said container,
   (e) a metering valve regulating the gravity flow of said food materials from each of said hoppers to said chambers,
   (f) means for operating said metering valves whereby to admit to said chambers the quantities of each food material required to fill a container,
   (g) means for supporting a container beneath said filling head coaxially therewith to receive therein food materials flowing by gravity from said head,
   (h) means for producing relative rotation of said flow controlling means and said container supporting means about the vertical axis of said container, whereby said food materials are deposited in said container in a decorative pattern visible through said container.

2. An apparatus as recited in claim 1 wherein said apertures are narrow and elongated, the major dimensions thereof being disposed substantially radially to the vertical axis of said container.

3. An apparatus as recited in claim 1 wherein said apertures are narrow and elongated, the major dimensions thereof being disposed substantially radially to the vertical axis of said container, and wherein said apertures are tapered in width, the ends thereof distal from said axis being wider than the ends thereof adjacent said axis.

References Cited

UNITED STATES PATENTS

| | | | |
|---|---|---|---|
| 1,397,520 | 11/1921 | Howe | 141—100 |
| 2,032,163 | 2/1936 | Bagby | 221—103 |
| 2,347,083 | 4/1944 | Connellee et al. | 107—1.4 X |
| 2,409,339 | 10/1946 | Ballard | 107—1.4 X |
| 3,117,871 | 1/1964 | Bahr et al. | 99—128 |
| 3,267,971 | 8/1966 | Mueller | 141—9 |
| 3,278,314 | 10/1966 | Colby et al. | 99—128 |
| 3,347,287 | 10/1967 | Geber | 141—105 |

A. LOUIS MONACELL, Primary Examiner

S. B. DAVIS, Assistant Examiner

U.S. Cl. X.R.

99—128, 171; 107—1; 141—283